(12) United States Patent
Lee

(10) Patent No.: US 12,456,804 B2
(45) Date of Patent: Oct. 28, 2025

(54) HIGH-PERFORMANCE MOBILE COMMUNICATION ANTENNA DEVICE

(71) Applicants: Don Shin Lee, Seoul (KR); HIGHGAIN ANTENNA CO., LTD., Seoul (KR)

(72) Inventor: Don Shin Lee, Seoul (KR)

(73) Assignees: Don Shin Lee, Seoul (KR); HIGHGAIN ANTENNA CO., LTD., Ansan-si (KR)

( * ) Notice: Subject to any disclaimer, the term of this patent is extended or adjusted under 35 U.S.C. 154(b) by 292 days.

(21) Appl. No.: 17/914,413

(22) PCT Filed: Sep. 1, 2021

(86) PCT No.: PCT/KR2021/011768
§ 371 (c)(1),
(2) Date: Sep. 26, 2022

(87) PCT Pub. No.: WO2022/050690
PCT Pub. Date: Mar. 10, 2022

(65) Prior Publication Data
US 2023/0216188 A1      Jul. 6, 2023

(30) Foreign Application Priority Data

Sep. 2, 2020   (KR) .................. 10-2020-0111858
Apr. 12, 2021  (KR) .................. 10-2021-0047372

(51) Int. Cl.
*H01Q 3/30*     (2006.01)
*H01Q 1/24*     (2006.01)
(Continued)

(52) U.S. Cl.
CPC ............... *H01Q 3/30* (2013.01); *H01Q 1/246* (2013.01); *H01Q 1/52* (2013.01); *H04B 1/16* (2013.01)

(58) Field of Classification Search
CPC ........................................... H01Q 3/30
See application file for complete search history.

(56) References Cited

U.S. PATENT DOCUMENTS

| | | | | |
|---|---|---|---|---|
| 6,125,138 | A * | 9/2000 | Kumagai | .................. H04L 5/16 455/249.1 |
| 2019/0140749 | A1* | 5/2019 | Kim | ....................... H04B 17/12 |
| 2020/0295798 | A1* | 9/2020 | Zihir | .................... H04B 1/0458 |

FOREIGN PATENT DOCUMENTS

| | | |
|---|---|---|
| JP | 2002135013 | 5/2002 |
| JP | 2005204230 | 7/2005 |

(Continued)

*Primary Examiner* — Hsinchun Liao
(74) *Attorney, Agent, or Firm* — LEX IP MEISTER, PLLC

(57) ABSTRACT

The present disclosure relates to a high-performance mobile communication antenna device capable of significantly reducing the number of relay stations and base stations for 5G communication by significantly improving the signal-to-noise ratio. The disclosed antenna device comprises the first high-gain low-noise amplifier, a phase shifter, a receiving and transmitting antenna part diplexers, and a band-pass filter, wherein the horizontal radiation pattern of the receiving antenna part has the same beam width as that of the transmitting antenna part, and the number of receiving radiation elements of the receiving antenna part is greater than the number of transmitting radiation elements of the transmitting antenna part.

15 Claims, 12 Drawing Sheets

(51) Int. Cl.
  *H01Q 1/52* (2006.01)
  *H04B 1/16* (2006.01)

(56) References Cited

FOREIGN PATENT DOCUMENTS

| KR | 20010020214 | 3/2001 |
| KR | 20110075219 | 7/2011 |
| KR | 20120066749 | 6/2012 |
| KR | 20160028896 | 3/2016 |

* cited by examiner

"Q" detail

HIGH-PERFORMANCE MOBILE COMMUNICATION ANTENNA DEVICE

TECHNICAL FIELD

The present disclosure relates to a transmitting and receiving antenna device for a base station or repeater of a mobile communication network, and more particularly, a high-performance mobile communication antenna device capable of significantly reducing the number of base stations for 5 generation (5G) communication by significantly improving the signal-to-noise ratio to increase the arrival distance of a transmitting and receiving signal.

DESCRIPTION OF THE RELATED ART

Although 5G communication networks are being built rapidly in recent years, the 5G frequency band has risen by two to three times compared to the 4G, 3G, and 2G frequencies, and as the frequency of the communication network increases, a wide communication band is secured to enable high-speed data communication. However, the use of high-frequency band transmission and reception frequencies, compared to 4G, 3G, and 2G transmission and reception frequencies, increases the spatial radiation loss of transmitting and receiving signals, and the distance at which signals are transmitted and received from base stations and repeaters has rapidly decreased. Therefore, there occurred a matter that the number of base stations and repeaters had to be increased 10 times or more compared to the existing LTE communication network.

DISCLOSURE OF THE INVENTION

Technical Goals

An aspect is to provide a high-performance mobile communication antenna device, which may significantly increase the radiation element of the receiving antenna part after separating the transmitting antenna part and the receiving antenna part, and significantly improve the signal-to-noise ratio by using merely one set of low noise amplifier (LNA), and further, may reduce a base station installation location by $1/10$ or less by attaching a multi-layer shielding film between the transmitting antenna part and the receiving antenna part to reduce interference of the receiving antenna part by a transmitting signal to increase a transmission and reception distance of a signal by about 3 to 5 times compared to an antenna in the related art.

An aspect is to provide a high-performance mobile communication antenna device, which has a plurality of low-noise amplifiers and a switch part, and may adjust the switch part remotely when any low-noise amplifier is damaged to automatically drive another low-noise amplifier to operate.

An aspect is to provide an antenna device which may be capable of simultaneously transmitting and receiving 5G, 4G, 3G, and 2G signals of different frequency bands by providing antenna for 5G that transmits and receives with one frequency in Time Division Duplex (TDD) method and antenna in parallel for 4G, 3G, and 2G that transmits and receives with different frequencies using Frequency Division Duplex (FDD) method.

An aspect is to provide a high-performance mobile communication antenna device, in which a low-gain transmitting antenna for transmitting power to a terminal side and a high-gain antenna for receiving a low signal of the terminal are respectively used, but a diplexer may not be used in a TDD scheme using the same frequency for a transmission and reception, and thus transmission and reception are separated using a high-output transmission signal interference canceller.

Technical Solutions

In order to achieve the above aspects, the antenna device of the present disclosure separates the antenna into a 5G receiving antenna part and a 5G transmitting antenna part, and the receiving antenna part includes a plurality of receiving radiation elements Rm than a transmitting radiation element Tn of the transmitting antenna part, and the number of the receiving radiation elements Rm and the transmitting radiation elements Tn included in each of the receiving antenna part and the transmitting antenna part may be arbitrarily adjusted to adjust the gain of the transmitting and receiving antenna parts. In other word, the receiving antenna part that needs to receive a signal transmitted from the mobile station has to receive a signal having a low output transmitted from the mobile station, so it has a plurality of receiving radiation elements Rm, and since the transmitting antenna part that needs to transmit a signal to the mobile station is connected to an external power source to transmit a signal having a large signal gain, it has a smaller number of transmitting radiation elements Tn than the receiving radiation elements of the receiving antenna part, so that it is possible to minimize interference between the receiving antenna part and the transmitting antenna part. This is the difference between the antenna of the present disclosure and the antenna in the related art which frequency-divides a signal received from one radiation element and transmits it to one radiation element. In addition, it includes a plurality of 5G band-pass filters (BPF) and a frequency band-pass filter licensed to any telecommunication service provider so that the receiving signal for each band does not interfere with the transmitting antenna part and the transmitting signal of other frequency bands does not interfere with the receiving antenna part. In another example embodiment, in order to further reduce the interference between the receiving antenna part and the transmitting antenna part, a multi-layered shielding film (e.g. having a height of about $1/4$ of the wavelength of the transmitting and receiving signal) may be installed. Due to the shielding film, it is possible to reduce reception noise caused by passive intermodulation (PIM) generated in the transmitting antenna part.

An antenna according to another example embodiment of the present disclosure for achieving the above matter is characterized in that it includes a transmitting antenna for transmitting a downlink signal to a terminal side, a receiving antenna for receiving an uplink signal from the terminal, and a transmitting signal interference canceller connected to the base station transceiver for transmitting transmission signals to the transmitting antenna side without loss, but attenuating to the receiving antenna side to remove the interference of transmitting signals of the same frequency band at the receiving side, and transmitting the receiving signals of the receiving antenna to the base station transceiver without loss.

The antenna device for the mobile communication may further include an antenna interference canceller in which a transmitting output interference canceller is shielded 2 to 3 layers in a height of about $1/4$ wavelength choke type around the transmitting antenna and the receiving antenna in order to remove the interference on the receiving antenna side when radiating the transmitting antenna output, and a shielding metal plate with a radio wave absorber attached thereto is attached around the transmitting antenna.

In addition, the above transmitting signal interference canceller is such that the downlink inputs the transmitting signal to the terminal 1 of the isolator I and then connects the lossless output of the terminal 2 to the transmitting antenna to radiate radio waves, the output of −20 dB or less of the terminal 3 is connected to the first to third circulators C2, C3, C4, respectively, to reduce by −20 dB or more, and the uplink delivers the LNA output of the receiving antenna to the terminal 3 of the third circulator C4, the terminal 3 of the second circulator C3, the terminal 3 of the first circulator C2, and the terminal 3 of the isolator I losslessly so that the uplink is not affected by the high-output transmitting signal of the downlink.

Effects

As described above, the antenna device according to the present disclosure provides an antenna device capable of increasing the transmission and reception distance of the signal by about 3 to 5 times compared to the antenna for communication in the related art by minimizing the transmission and reception interference of the antenna and, thus, service costs may be lowered by dramatically reducing the number of base stations and repeaters installed for 5G communication to reduce facility costs.

In addition, it is possible to provide an antenna device in which the low-noise amplifier, which is easily damaged in the antenna device, may be easily switched remotely.

In addition, it is possible to provide an antenna device capable of simultaneously transmitting and receiving 5G, 4G, 3G, and 2G communication signals of different bands with one antenna.

And according to another example embodiment of the present disclosure, the receiving antenna makes the total gain of 60 dB or more so that the low-power signal of the terminal radiating at a distance of 1000 m may be received by the base station antenna at a distance of 1000 m or more, and the output of the transmitting antenna is set to low power in order to reduce the interference of services in other areas at a distance of 1000 m or more, and thus the base station and the relay station for 5G service, which are currently installed at intervals of 200 m, may be installed at intervals of 500 m to 1000 m rarely so that the base station facility cost may be reduced by reducing the base station facility cost by more than 1/10 or more, and the optical transmission cost of the relay link may be greatly reduced.

DETAILED DESCRIPTION FOR CARRYING OUT THE INVENTION

Figure 1:
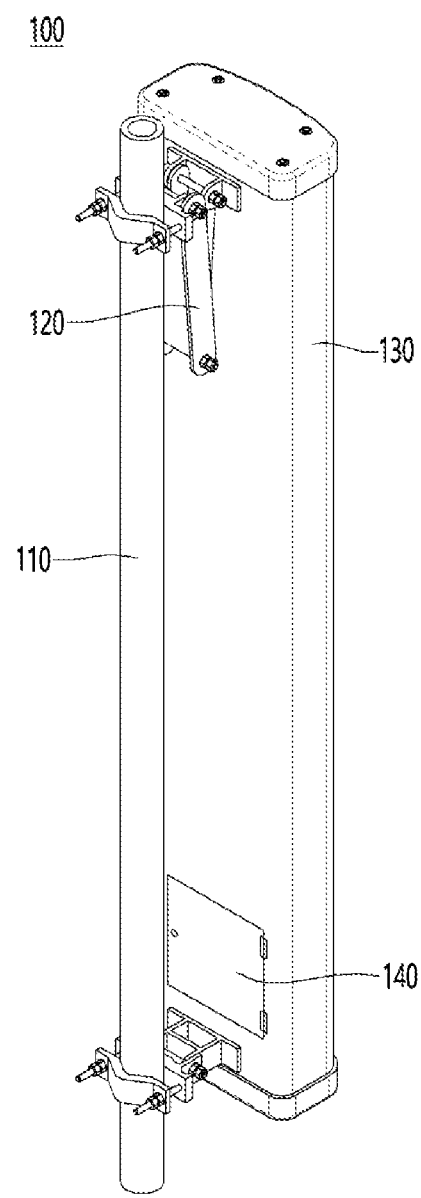
FIG. 1 is a perspective view of an antenna body of the present disclosure having a switch for replacing a low-noise amplifier.

Detailed description of the present disclosure to be described later refers to the accompanying drawings, which show by way of illustration specific example embodiments in which the present disclosure may be practiced. These example embodiments are described in sufficient detail to enable those skilled in the art to practice the present disclosure. It should be understood that the various example embodiments of the present disclosure are different but need not be mutually exclusive. For example, certain shapes, structures, and characteristics described herein with respect to one example embodiment may be embodied in other example embodiments without departing from the spirit and scope of the disclosure. In addition, it should be understood that the location or arrangement of individual components within each disclosed example embodiment may be changed without departing from the spirit and scope of the present disclosure. Accordingly, the detailed description set forth below is not intended to be taken in a limiting sense, and the scope of the present disclosure, if properly described, is limited merely by the appended claims, along with all scope equivalents to those claimed. Like reference numerals in the drawings refer to the same or similar functions throughout the various aspects.

Hereinafter, preferred example embodiments of the present disclosure will be described in more detail with reference to the drawings.

FIG. 1 is a perspective view of an antenna of the present disclosure having a switch for replacing a low-noise amplifier.

The antenna of the present disclosure is accommodated in the antenna outer cover 130, the antenna outer cover 130 is attached to the antenna support 110 using a mechanical beam tilt part 120, and the antenna outer cover 130 includes a low-noise amplifier replacement cover 140 on the back of the antenna.

The mechanical beam tilt part 120 includes a folding structure, and performs a mechanical beam tilt for mechanically adjusting the direction of the antenna beam using the folding structure. In addition, if the low-noise amplifier for 5G signal reception or the power control panel is damaged, the low-noise amplifier or the power control panel may be replaced by opening and closing the low-noise amplifier replacement cover 140 while the antenna is installed.

Figure 2:
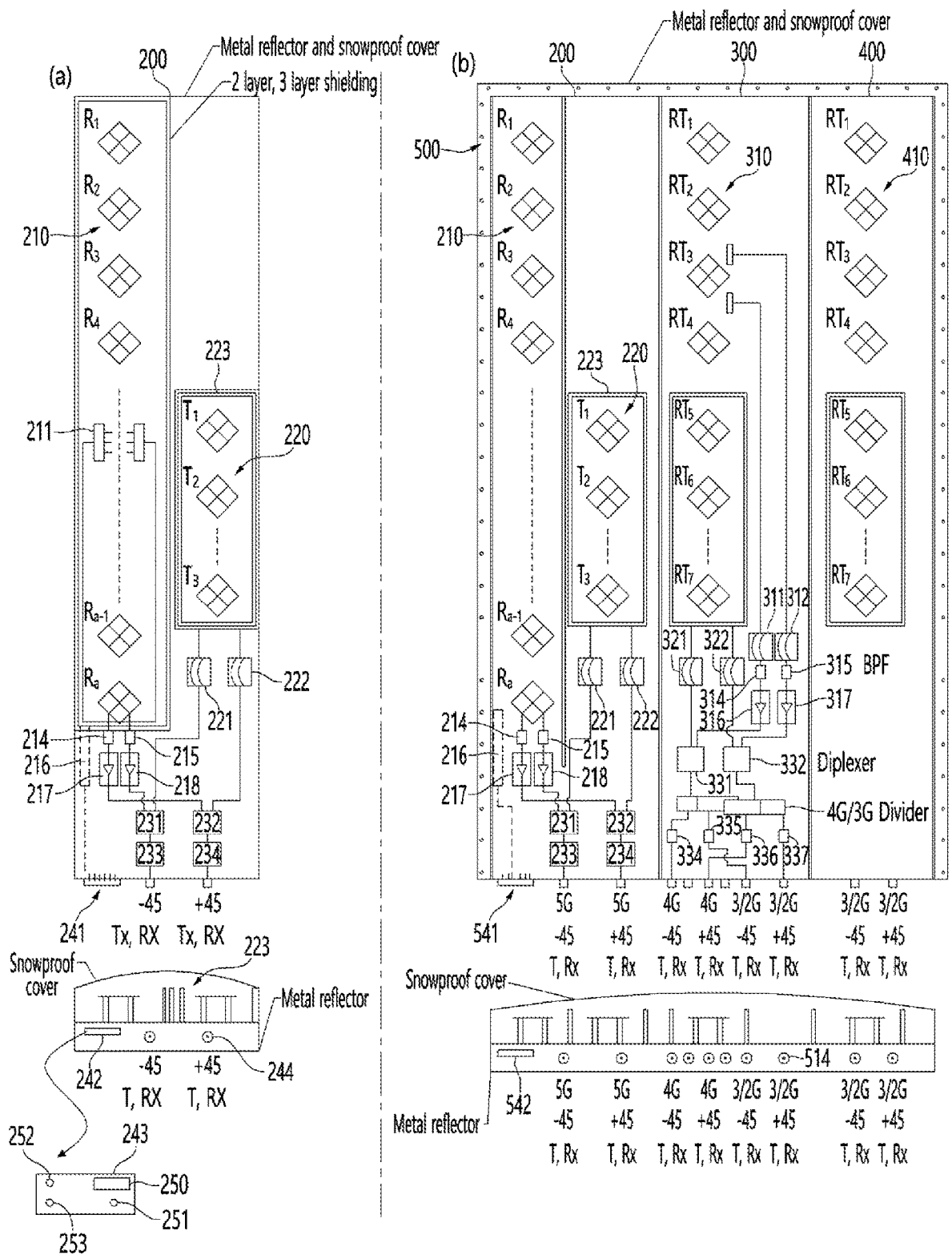
FIG. 2 is an overall configuration diagram of the antenna of the present disclosure, (a) of FIG. 2 shows a transmission and reception separate type single antenna for 5G, and (b) of FIG. 2 shows a transmission and reception separate type composite antenna for 5G, 4G, 3G, and 2G signals.

FIG. 2 shows the antenna device of the present disclosure, (a) of FIG. 2 shows a single antenna for 5G signal transmission and reception, and (b) of FIG. 2 shows a composite antenna for 5G, 4G, 3G, and 2G signals transmission and reception.

In FIG. 2, the single antenna of (a) is a time division duplex (TDD) type transmitting and receiving antenna, which may be configured that the receiving radiation elements Rm of the receiving antenna part 210 are vertically arranged, for example, by 20 elements or more to increase the gain, and the transmitting radiation element Tn of the transmitting antenna part 220 is vertically arranged, for example, by 10 elements so that the transmit gain of the transmitting antenna part 220 is less than ½ of the receive gain of the receiving antenna part.

In addition, the receiving antenna part 210 performs a mechanical beam tilt to adjust the beam tilt angle of the antenna using a mechanically variable folding structure, while the signal input to the transmitting antenna part 220 performs electrical beam tilt thereby changing the phase of a signal to form a vertical beam having a desired beam tilt angle using a phase shifter 221 and 222.

Additionally, it may be configured that a multi-layered metal shielding film 223 is installed around the transmitting and receiving antenna part at a height of about ¼ at a wavelength of a 5G frequency band (e.g. 3.4 GHz to 3.7 GHz) so that the transmitting signal of a transmitting radiation element Tn does not interfere the receiving radiation element Rm as much as possible. In some cases, it may also be applied to antennas for 4G, 3G, and 2G.

The signal synthesis of the receiving radiation element Rm of the 5G receiving antenna part 210 was synthesized with a honeycomb strip PCB to reduce PCB loss, and the signal received from the −45° antenna receiving radiation element Rm passes through the band pass filter 215 and the low-noise amplifier 218, then is synthesized using a BPF or an isolator so that there is no mutual interference in the diplexer or the transmission signal canceller 231 of the transmitting and receiving antennas, and, then is passed through the 5G band pass filter 233 of the available frequency band and is output to the −45° connector terminal.

The signal received at the +45° antenna receiving radiation element also passes through the band pass filter 214 and the low-noise amplifier 217 as same as the signal received at the −45° antenna receiving radiation element Rm, and then is synthesized using a BPF or an isolator so that there is no mutual interference in the receiving and transmitting antenna part diplexer or the transmission signal canceller 232, and is output to the +45° connector terminal.

Here, the −45° antenna receiving radiation element refers to a receiving radiation element in which the direction of the receiving radiation element is rotated by −45°, and the +45° antenna receiving radiation element refers to a receiving radiation element in which the direction of the receiving radiation element is rotated by +45°.

In FIG. 2, (b) is an antenna 500 operated by additionally combining frequency division dual antennas of multiple bands on a single reflector, and the transmission and reception band may be adjusted according to the purpose of the antenna such as 5G, 4G1 or 4G2, 3G, and 2G with different transmission and reception frequencies. In addition, the low-noise amplifiers 217, 218, 316, and 317 used in this antenna generally have a gain of 30 dB to 60 dB or more, and may adjust the gain of the low-noise amplifier 217, 218, 316 and 317 manually or automatically by attaching an attenuator that may increase or decrease the gain depending on the base station or repeater, and includes an output terminal capable of transmitting the output state of the low-noise amplifier 217, 218, 316 and 317 to the operating room.

Figure 3:
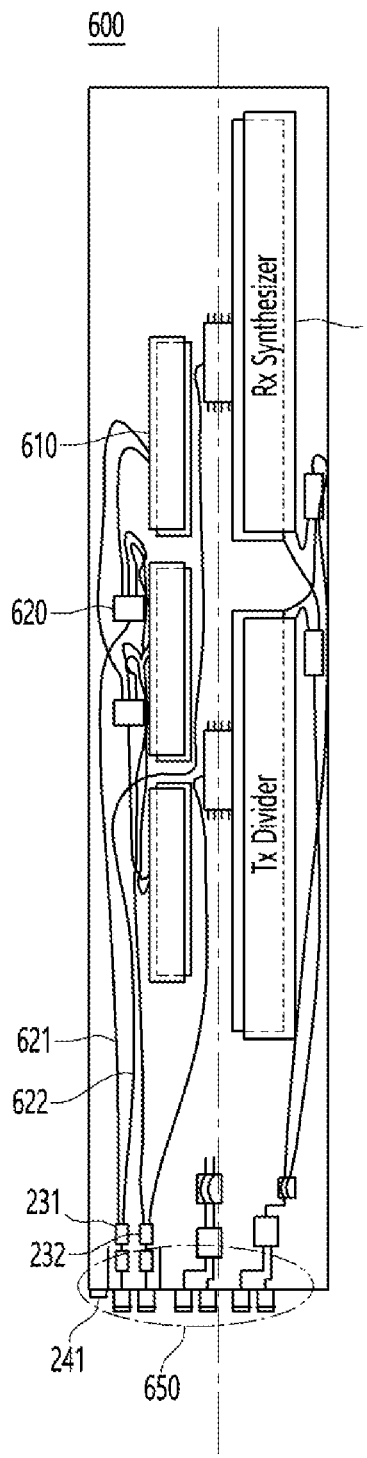
FIG. 3 is a rear view of the antenna of the present disclosure, showing a distribution feed diagram of a strip line or micro strip line instead of a coaxial cable for each radiator.
Figure 3:
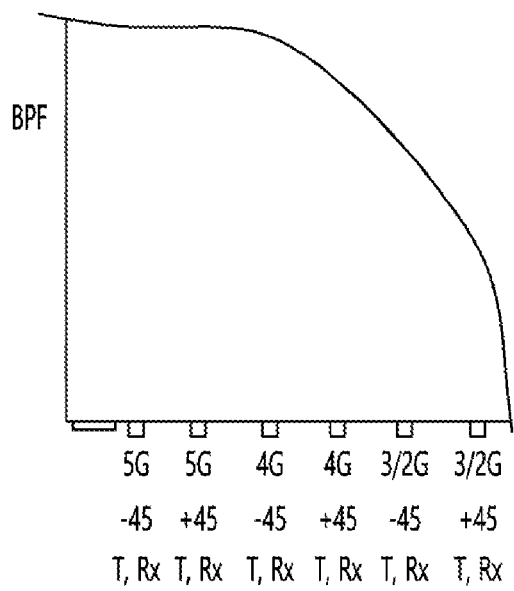

FIG. 3 is a rear view of the reflector used in the antenna of the present disclosure.

The receiving antenna part 210 for 5G signal of the antenna of the present disclosure is provided with a plurality of receiving radiation elements Rm, and, when a plurality of receiving radiation elements Rm are fed using an existing coaxial cable, a lot of signal loss may be caused due to the impedance component of the cable itself. Therefore, in the present disclosure, the receiving radiation element Rm of the receiving antenna part 210 and the diplexer or transmission signal canceller 231 and 232 are connected with a PCB wiring, which is a low-loss honeycomb synthesizer, to significantly reduce the synthesis loss of the receiving signal. On the other hand, in the case of the 5G transmitting antenna part 220, since the transmitting antenna part 220 is connected to an external power source, the transmission output itself may be arbitrarily adjusted and thus less sensitive to signal attenuation, the transmitting radiation element Tn of the transmitting antenna part 220 and the phase shifters 221 and 222 are connected using a coaxial cable. In the case of 4G, 3G, and 2G transmitting and receiving antennas 300 and 400, the power is fed through a coaxial cable or a general PCB board.

Figure 4:
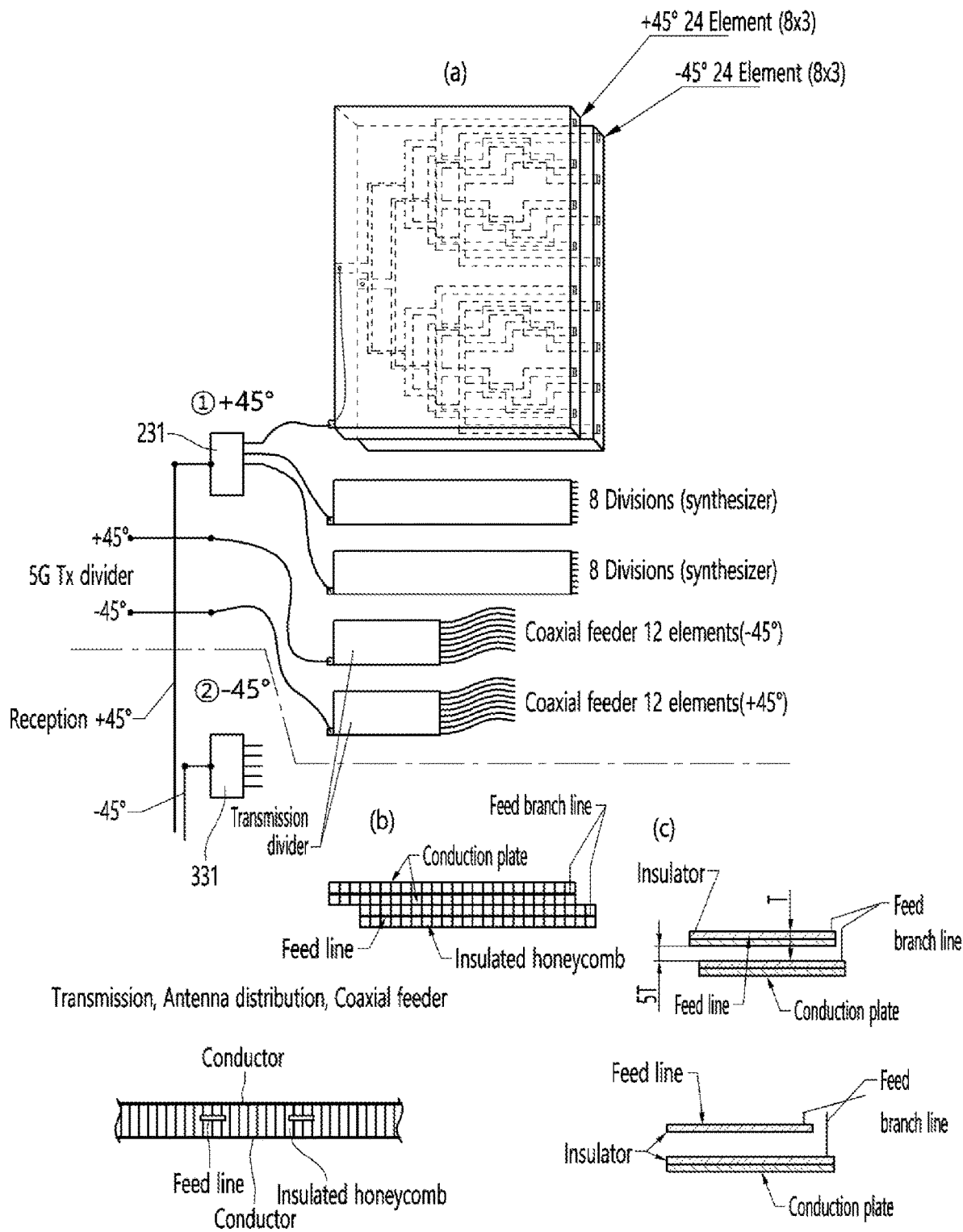
FIG. 4 is a strip line for a distribution feeder of a receiving antenna part for 5G, (a) of FIG. 4 shows an 8 distribution wiring strip line, (b) of FIG. 4 shows a cross-sectional view of each strip line, (c) of FIG. 4 shows a cross-sectional view of each microstrip line.

FIG. 4 shows a strip (micro strip) line for a synthesis feed line of a receiving antenna part for 5G.

Referring to FIG. 4, (a) shows an 8 distribution wiring strip line, (b) shows a cross-sectional view of each strip line, and (c) shows a cross-sectional view of each micro strip line.

In the case of receiving a signal from the antenna 200 for 5G of the present disclosure, a strip line composed of an insulated honeycomb is used instead of a cable to feed the receiving radiation elements Rm of +45°, 24 receiving radiation elements Rm are connected to the diplexer or the transmission signal canceller 231 and 232 to greatly reduce the loss of the feed line by using 3 sets of honeycombs that may be connected to 8 receiving radiation elements Rm. In addition, when transmitting a signal from the antenna 200 for the 5G of the present disclosure, the transmitting radiation elements Tn of ±45° is fed by each of the phase shifters 221 and 222 using a coaxial cable.

Figure 5:
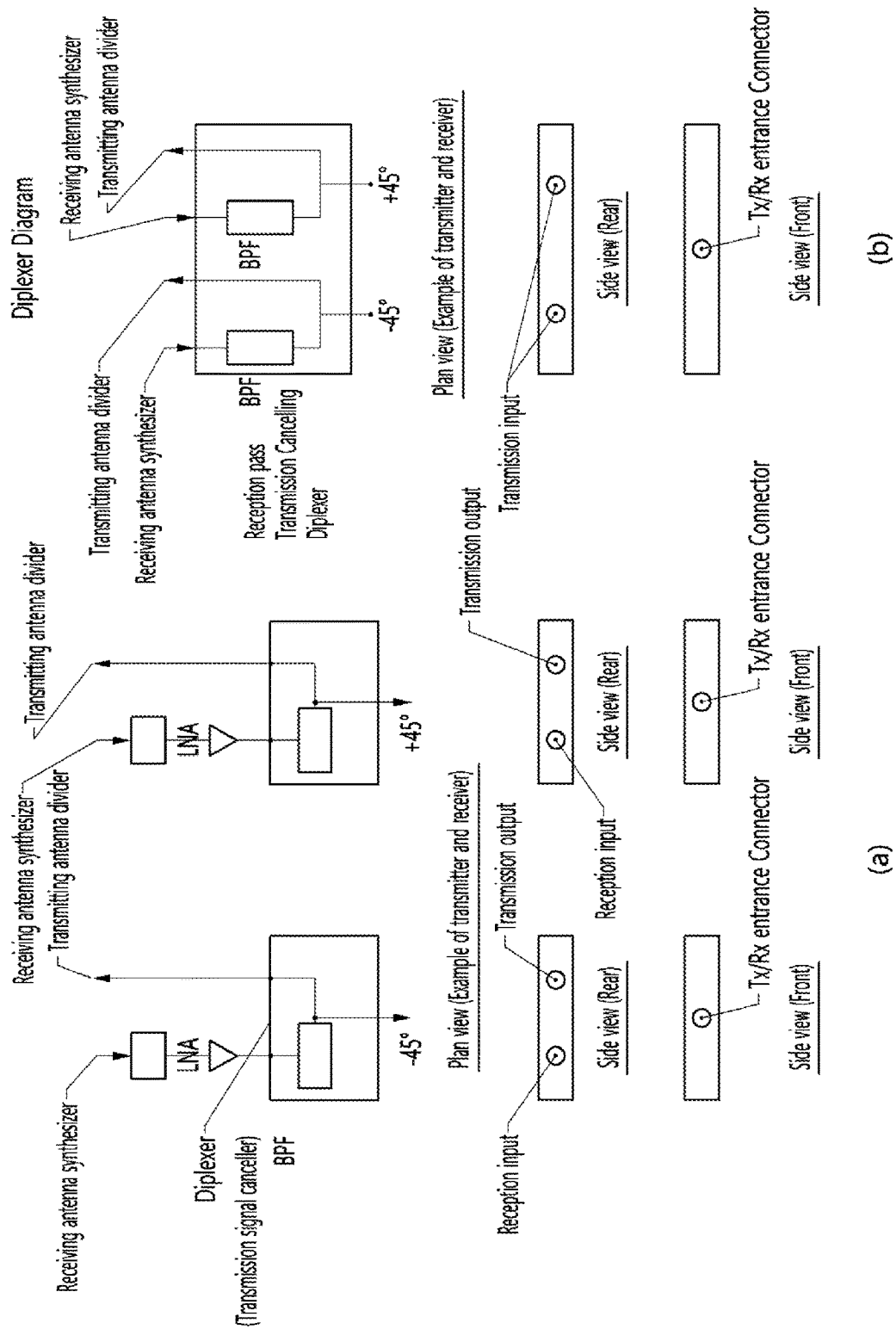
FIG. 5 is a block diagram and a side view of a diplexer that is a receiving and transmitting signal synthesizer, (a) of FIG. 5 is a synthesizer diplexer for 5G, and (b) of FIG. 5 shows a plan view and a side view of a diplexer that is a transmitting and receiving synthesizer for 4G, 3G or 2G.

FIG. 5 is a device for synthesizing a reception low-noise amplifier signal and a transmitting signal in a 5G honeycomb stripline reception diplexer or transmission signal canceller 231, and is an example configured using a BPF, an isolator, which are transmission signal cancellers, and a circulator, etc., so that the transmitting signal does not interfere with the reception low-noise amplifier. In FIG. 5, (a) is a plan view and a side view of a synthesis diplexer (transmission signal canceller) for 5G, and (b) is a plan view and a side view of a diplexer that is a transmission and reception synthesizer for 4G, 3G or 2G.

Figure 6:
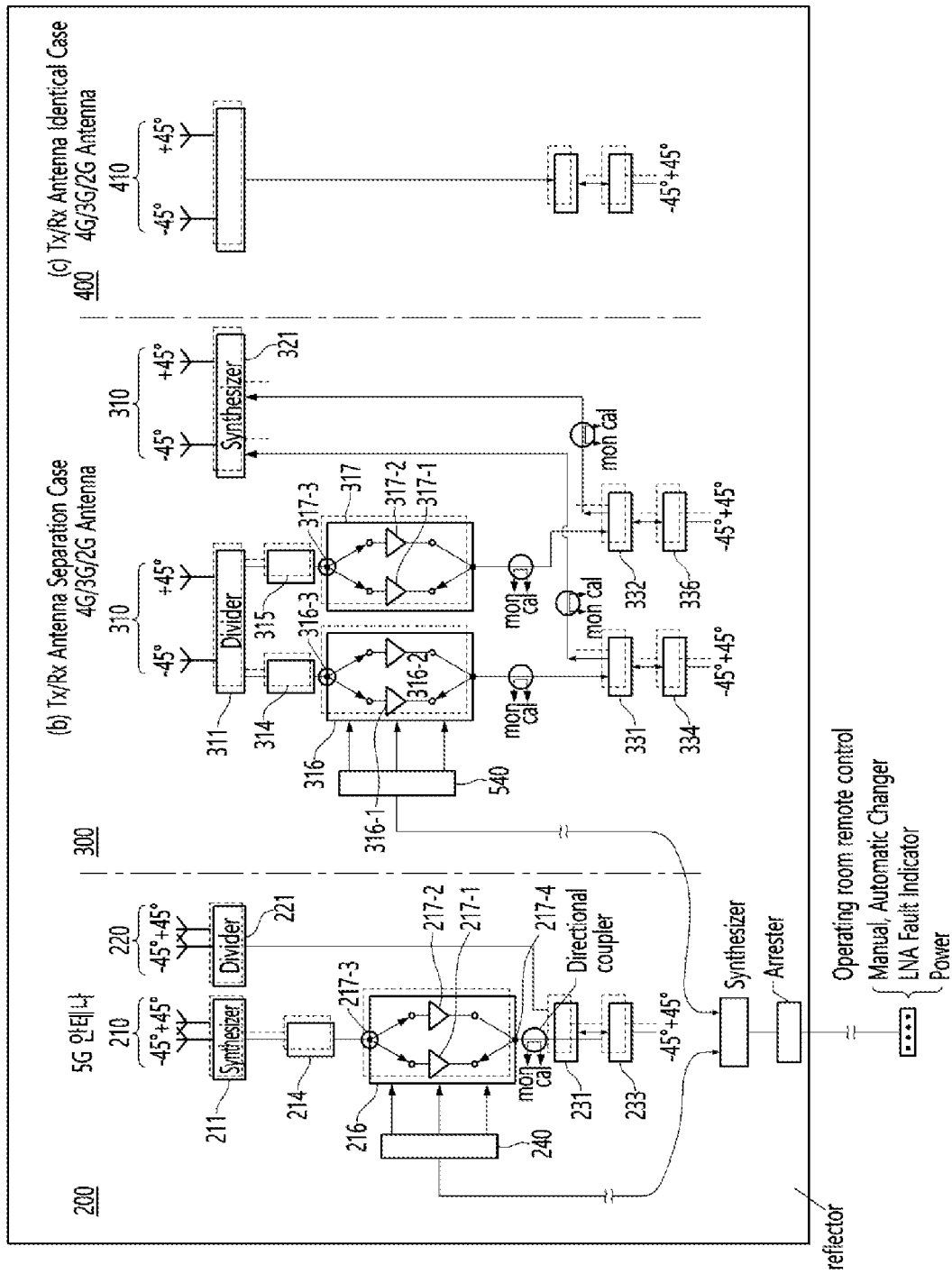
FIG. 6 is a block diagram illustrating the configuration of connecting the input/output terminals synthesized and distributed by attaching the antenna for 5G to a single reflector in combination with the 4G, 3G, and 2G antennas to the reception low-noise amplifier and the transmission and reception diplexer.

FIG. 6 shows a diagram in which the 4G, 3G, and 2G antennas (in the case of using a transmitting antenna separate type or a transmitting and receiving single antenna) synthesize a received synthesized signal and a transmitting signal to be distributed in a synthesizer (diplexer) when the 5G antenna of FIG. 2 is installed in a single panel in combination with the 4G antenna, 3G antenna, or 2G antenna.

Referring to FIG. 6, the signal synthesized from the 5G receiving antenna passes through the BPF 214, passes through the switch 217-3, and is connected to the first low-noise amplifier 217-1 and the second low-noise amplifier 217-2, and is connected to the switch 217-4 to be connected to the transmission and reception synthesis diplexer or transmission signal canceller 231, and the transmitting signal is connected to the divider 221 to feed the transmitting antenna. In addition, when the low-noise amplifier power supply, the switch power supply, and the first low-noise amplifier 217-1 fail, it is automatically switched to the second low-noise amplifier 217-2 using the control panel 240, and it is connected to the control cable terminal with an arrester attached.

The control panel 240 transmits a failure signal to the remote operation room when the first low-noise amplifier fails, and has a separate remote control box connected to the control panel 240 in the operation room, and the remote control box may be switched between the first low-noise amplifier 217-1 and the second low-noise amplifier 217-2 by using the control panel 240, and it may be indicated whether the first low-noise amplifier 217-1 fails.

As shown in (b) of FIG. 6, the 4G, 3G and 2G antennas may also be used separately for transmitting and receiving antenna parts like the 5G antenna, and as shown in (c) of FIG. 6, as in the 4G, 3G, and 2G antenna method in the related art, a signal may be transmitted and received by a single antenna while omitting the low-noise amplifier.

Figure 7:
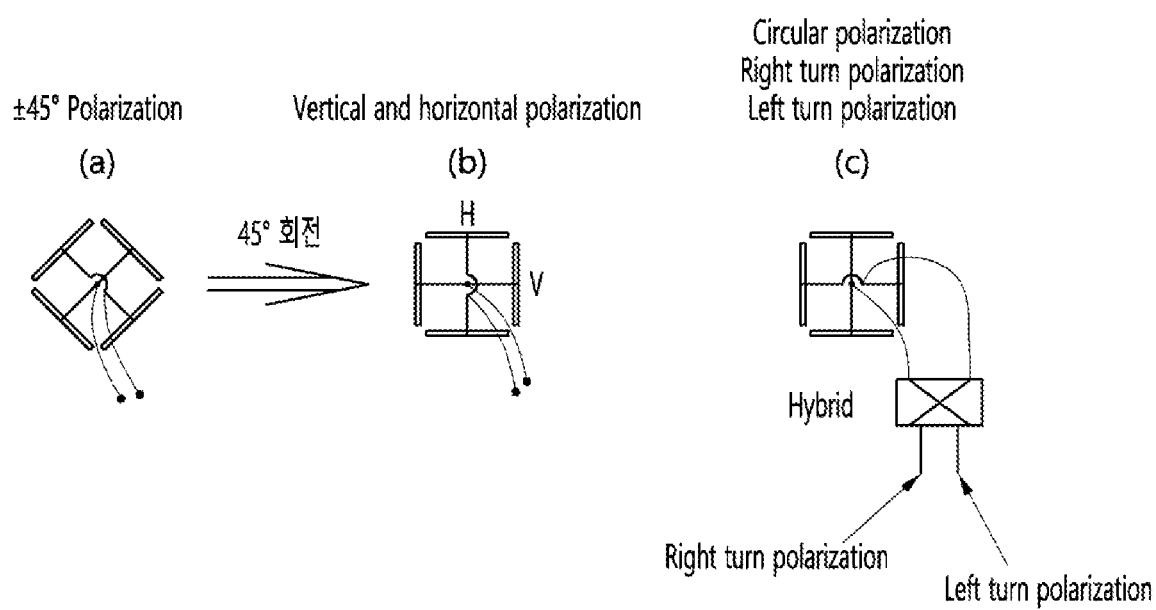
FIG. 7 shows the polarization type of the radiation element, (a) of FIG. 7 shows a ±45° polarization diversity type, (b) of FIG. 7 shows a 0°, 90° vertical and horizontal polarization diversity type, and (c) of FIG. 7 shows the circular polarization, left rotation polarization, and right rotation polarization diversity types.

FIG. 7 shows the polarization type of the radiation element, (a) of FIG. 7 shows a ±45° polarization diversity type, (b) of FIG. 7 shows a 0°, 90° vertical and horizontal polarization diversity type, and (c) of FIG. 7 shows the circular polarization, left rotation polarization, and right rotation polarization diversity types.

Figure 8:
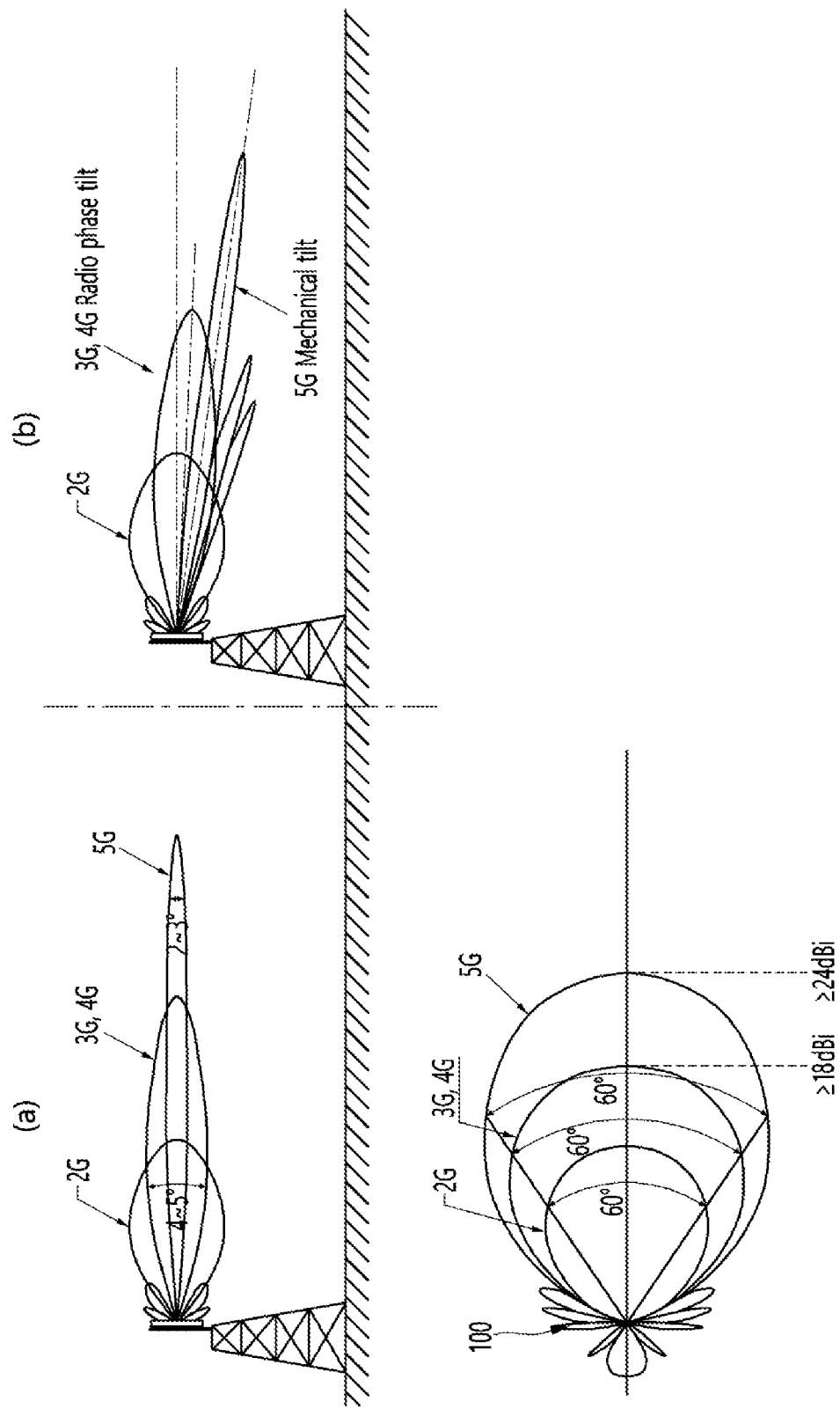
FIG. 8 is an antenna radiation pattern diagram, (a) of FIG. 8 is a radiation pattern diagram of 5G, 4G, 3G, 2G antenna in the vertical direction, (b) of FIG. 8 is a radiation pattern diagram of the antenna when the beam is tilted, and (c) of FIG. 8 is a beam pattern diagram in the horizontal direction.

FIG. 8 is an antenna radiation pattern diagram, (a) of FIG. 8 is a radiation pattern diagram of 5G, 4G, 3G, 2G antenna in the vertical direction, (b) of FIG. 8 is a radiation pattern diagram of the antenna when the beam is tilted, and (c) of FIG. 8 is a beam pattern diagram in the horizontal direction.

Referring to FIG. 8, the receiving antenna part 210 and the transmitting antenna part 220 of the present disclosure have the same horizontal beamwidth, and it is possible to provide the same transmission and reception sensitivity at all points where a signal is transmitted/received by the antenna part since the receiving antenna part 210 and the transmitting antenna part 220 have the same horizontal beamwidth.

In the case of 5G communication, since the receiving subscriber or mobile station is generally located within 100 m from the ground lower than the position of the base station in the vertical direction due to the characteristics of domestic apartments, the vertical beamwidth of the antenna is constantly implemented in a narrow state, but the horizontal beam width is implemented to be maintained at 60° or more since the receiving subscriber or the mobile station moves in a large width in the horizontal direction.

Figure 9:
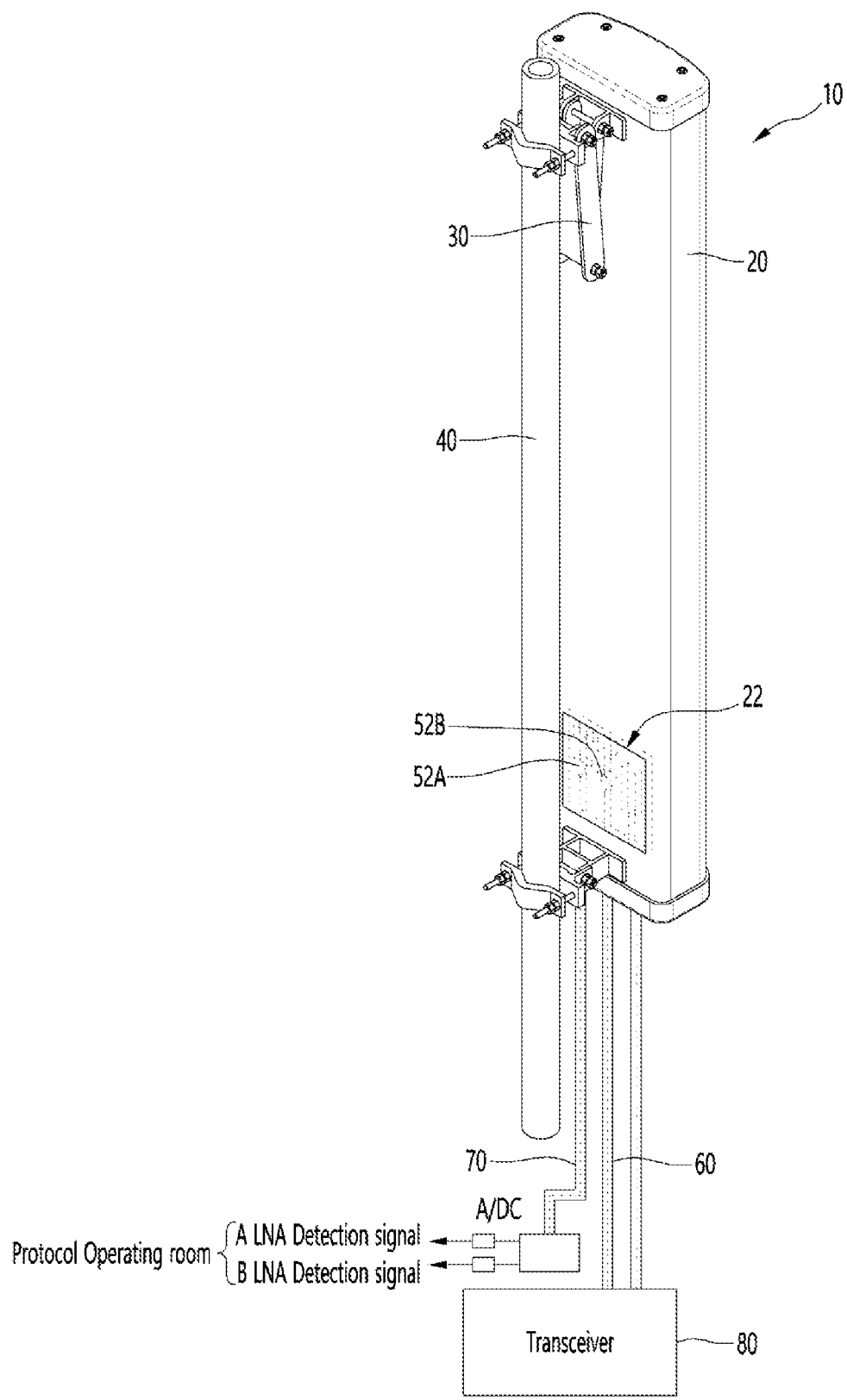
FIG. 9 is a perspective view of the entire antenna system according to the present disclosure including a switch for replacing the low-noise amplifier, a power supply line (shield or metal tube), and an antenna feeding line.
Figure 10:
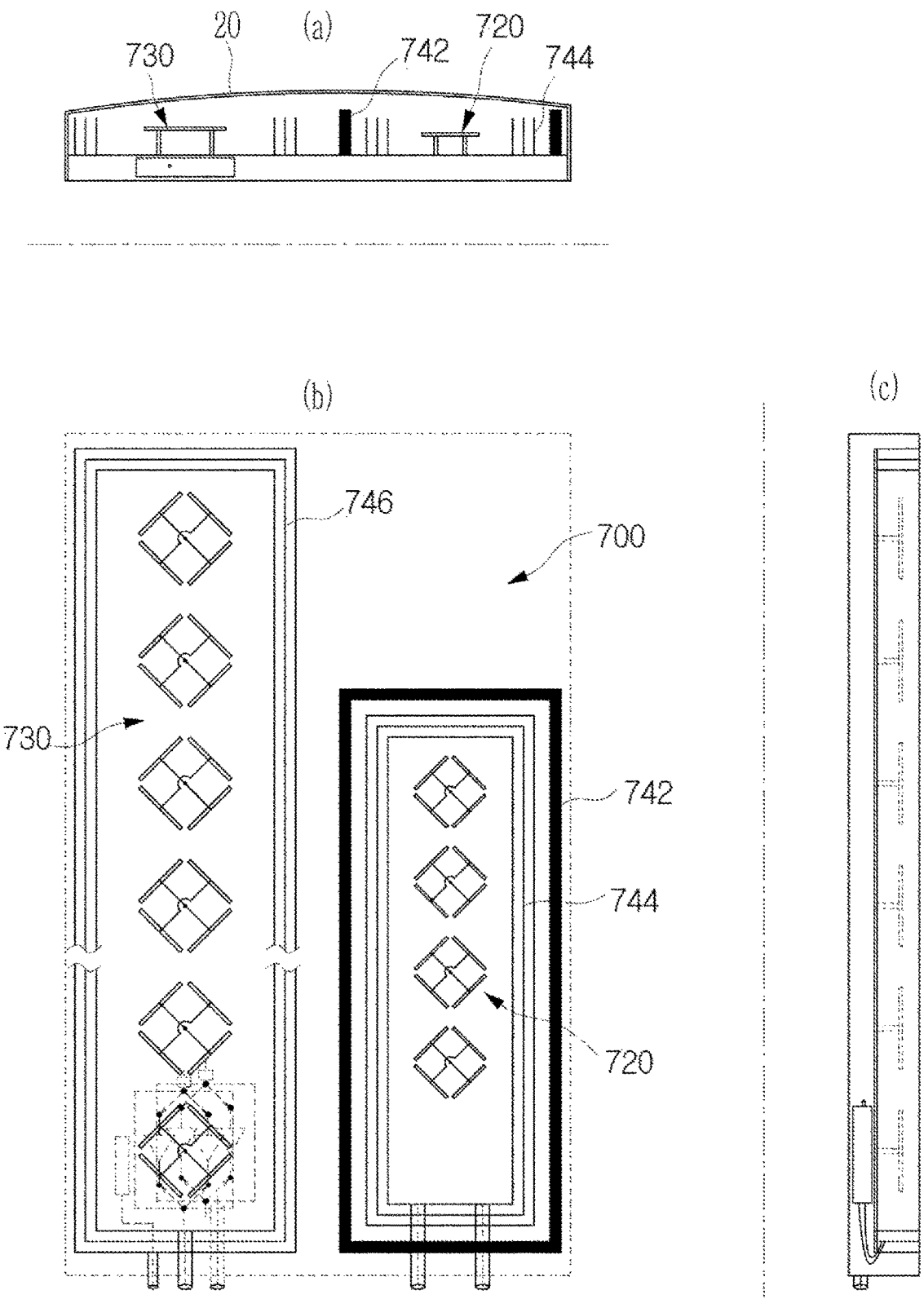
FIG. 10 is a three-sided view schematically showing the antenna mounted in the snowproof cover of FIG. 9.

FIG. 9 is a perspective view of the entire antenna system according to another example embodiment of the present disclosure including a switch for replacing the low-noise amplifier, a power supply line (shield or metal tube), and an antenna supply line, and FIG. 10 is a third side view schematically showing the antenna mounted in the snowproof cover of FIG. 9, (a) of FIG. 9 is a plan view, (b) of FIG. 9 is a front view and (c) of FIG. 9 is a side view.

In another antenna system 10 of the present display, as shown in FIGS. 9 and 10, the antenna 700 is accommodated in the snowproof cover 20, and the external snowproof cover 20 of the antenna 700 is attached to the antenna support 40 using a mechanical beam tilt part 30, and the snowproof cover 20 outside the antenna includes a low-noise amplifier replacement cover 22 on the rear side of the antenna.

The mechanical beam tilt part 30 includes a folding structure, and performs a mechanical beam tilt for mechanically adjusting the direction of the antenna beam by using the folding structure.

In addition, if the low-noise amplifier 52A and 52B for signal reception in the 2-6 GHz band or the power control panel is damaged, the low-noise amplifier 52A and 52B or the power control panel may be replaced by opening and closing the low-noise amplifier replacement cover 22 while the antenna 700 is installed. The power of the low-noise amplifiers 52A and 52B and the sensing signal of the control panel are controlled in the operating room using the power supply line (shield or metal tube; 70), and the RF signal Rx and Tx is connected to the transceiver 80 by using the antenna coaxial cable feed line 60A and 60B to transmit and receive it.

As shown in FIG. 10, the antenna 700 of another example embodiment accommodated inside the snowproof cover 20 is composed of a transmitting antenna 720 and a receiving antenna 730 in which a +/−45° radiator is arranged, and a radio wave absorber 742 and a choke type shielding plate 744 are provided around the transmitting antenna 720, and a choke type shielding plate 746 is also provided around the receiving antenna 730.

Figure 11:
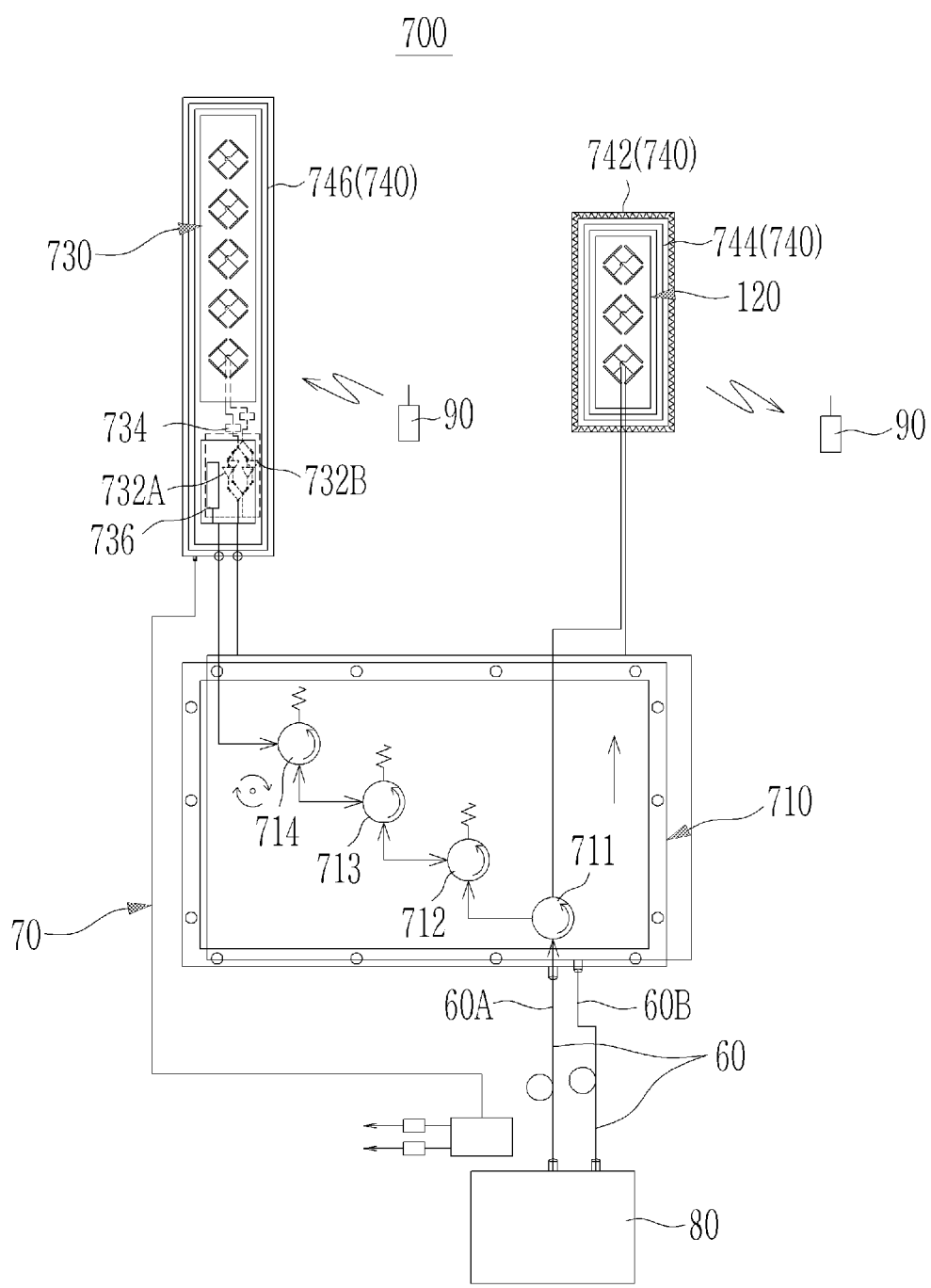
FIG. 11 is an example of a mobile communication antenna system to which an interference canceller capable of removing interference of a transmitting signal in 2 to 4 GHz band mobile communication according to another example embodiment of the present disclosure is attached.

FIG. 11 is a mobile communication antenna system to which an interference canceller is attached to remove a transmitting signal from interfering with a reception side in 2-4 GHz band mobile communication according to another example embodiment of the present disclosure.

As shown in FIG. 11, the mobile communication antenna system 700 of another example embodiment includes a base station transceiver device 80, a transmission signal interference canceller 710, a base station transceiver device 80, a coaxial cable 60 for connecting the transmission signal interference canceller 710, a power supply line 70 made of a shield or a metal tube, a terminal 90, a transmitting antenna 720, a receiving antenna 730, and an antenna interference canceller 740. A synthesizer 736, BPF 734, and LNAs 732A and 732B are attached to the receiving antenna substrate.

The transmission signal interference canceller 710 is connected to the base station transceiver 80 and the +45° and −45° coaxial cables 60A and 60B to transmit the transmitting signal to the transmitting antenna 720 without loss, and to attenuate it to the reception antenna 730 to remove interference from the transmitting signal of the same frequency band on the reception side, and the receiving signal of the receiving antenna 730 is transmitted to the base station transceiver 80 without loss.

The transmitting antenna 720 transmits the downlink transmitting signal passing through the transmission signal interference canceller 710 to the terminal 90 side, and the receiving antenna 730 is for receiving the uplink signal of the terminal 90.

Referring to FIG. 11, the transmitting antenna 720 and the receiving antenna 730 are separated from the external pylon in the 4G or 5G mobile communication service box within the 2G~4 GHz frequency band, and if the transmission path coaxial cable 60A and 60B from the outside to the room is used, the interference is removed by attaching the transmission signal interference canceller 710 to the inside, in addition, an antenna interference canceller 740 is attached between the transmitting antenna 720 and the receiving antenna 730 in order to remove the high power signal of the outdoor transmitting antenna 720 from interfering with the receiving antenna 130. The antenna interference canceller 740 includes a quarter-wave metal shield 744 attached to the outside of the transmitting antenna 720, a radio wave absorber shielding plate 742, and a quarter-wave metal shield 746 attached to the outside of the receiving antenna 730.

When transmitting from the base station or relay station transceiver 80 to the outdoor antenna system 10 through the coaxial cable 60, if the transmitting signal is separated and transmitted into the LNAs 732A and 732B attached to the receiving antenna 730 and the transmitting antenna 720, since both the transmit frequency and the receive frequency are the same, it becomes impossible to eliminate the interference of the transmitting signal with a diplexer or a band pass filter (BPF) in the related art.

Another example embodiment of the present disclosure is to attach a transmit signal interference canceller 710 having the same frequency as the receiving signal to remove the interference of the transmitting signal in the receiving LNAs 732A and 732B of the receiving antenna 730 using the same frequency as the transmitting signal. In the example embodiment of the present disclosure, since the transmitting and receiving antennas 720 and 730 have a structure in which a +45° radiator and a −45° radiator are arranged in a rhombus shape, the coaxial cable 60 and the transmission signal interference canceller 710 are also divided for +45° and −45°, and there are two, respectively, two are present as the receiving LNAs 732A and 732B.

The transmission signal interference canceller 710 will be described in more detail as follows. When the transmitting signal is input through the coaxial cable 60 in the base station in case of transmission and reception through the coaxial cable 60, it is input to the terminal 1 of the isolator 711 (I1), and then is input and radiated from the terminal 2 to the transmitting antenna side without loss, and is output to the terminal 3 of the isolator 711 (I1) with reduced by 25 dB.

The output of terminal 3 attenuated at the isolator 711 (I1) is input to the terminal 1 of the first circulator 712 (C2) and absorbed into the dummy load at the terminal 2 of the first circulator 712 (C2), and a signal attenuated by −25 dB or more in the circulator 712 (C2) is output to the terminal 3.

The output of terminal 3 attenuated at the first circulator 712 (C2) is input to the terminal 1 of the second circulator 713 (C3) and absorbed as an output dummy load at the terminal 2 of the second circulator 713 (C3), and is attenuated by −25 dB or more to be output to the terminal 3 of the second circulator 713 (C3).

The signal attenuated at the second circulator 713 (C3) is input to the terminal 1 of the third circulator 714 (C4) and absorbed as an output dummy load to the terminal 2 of the third circulator 714 (C4), and is output to the terminal 3 of the third circulator 714 (C4) so as to be −25 dB or less.

In this way, the high-power transmission signal input to the terminal 1 of the isolator 711 (I1) is lost by −25 dB, −25 dB, −25 dB, −25 dB=−80 dB~−90 dB or less and is connected to the LNA 732A and 732B output terminals of the receiving antenna 730, so that the interference effect of the transmitting signal is eliminated.

On the other hand, the LNA 732A and 732B output attached to the high-gain receiving antenna 730 is input to the terminal 3 of the third circulator 714 (C4) and then is out at the terminal 1 with almost no loss (0.2 dB or less), and is input to the terminal 3 of the second circulator 713 (C3) and then is output to the terminal 1 with almost no loss (0.2 dB or less), and is input to the terminal 3 of the first circulator 712 (C2) and then is output to terminal 1 (0.2 dB or less) of the first circulator 712 (C2) to be input to terminal 3 of isolator 711 (I1), and is output to terminal 1 of isolator 711 with almost no loss (0.2 dB or less) so as to be lossless (about −1 dB) and transmit it to the operating room (base station transceiver) housing with a coaxial cable (60).

In this way, the transmission signal interference canceller 710 of another example embodiment may cancel the transmitting signal interference at the receiving antenna side.

Meanwhile, the terminal 2 transmission output of the isolator I1 is input to the transmitting antenna 720 separated from the receiving antenna 730 and is radiated to the terminal 90, which may cause interference in the receiving antenna 730. Therefore, in the example embodiment of the present disclosure, an antenna interference canceller 740 is attached between the receiving antenna 720 and the transmitting antenna 730 in order to remove the interference between the transmitting antenna 720 and the receiving antenna 730.

Antenna interference canceller 740 attaches a triple or more choke type quarter-wave metal shield 744 around the transmitting antenna 720, and if necessary for the receiving antenna 730, the same choke type quarter-wave metal shield 746 is attached, and a shielding plate 742 of a radio wave absorber is attached additionally so that the transmitting antenna output is attenuated by −80 dB or more at the receiving antenna side to eliminate interference.

As described above, the present disclosure is about that a transmission signal interference canceller 710 is attached to the output side of the LNAs 732A and 732B of the receiving antenna 730 and the input side of the transmitting antenna 720, and the antenna interference canceller 740 is attached between the transmitting antenna 720 and the receiving antenna 730 to remove interference of the same frequency.

According to another example embodiment of the present disclosure, the receiving antenna 730 makes it possible to receive a small output signal of a terminal radiated from a long distance of 1000 m to the receiving antenna 730 of the base station at a distance of 1000 m or more by making the overall gain of 60 dB or more, and the output of the transmitting antenna 720 is set at a low output to reduce interference to services in other areas at a distance of more than 1000 m and the base stations and relay stations for 5G services which are currently installed at intervals of 200 m are rarely installed at intervals of 500 m to 1000 m, so that it is possible to reduce the cost by reducing the facility cost by more than 1/10 and the optical transmission cost of the relay link may also be greatly reduced.

Figure 12:
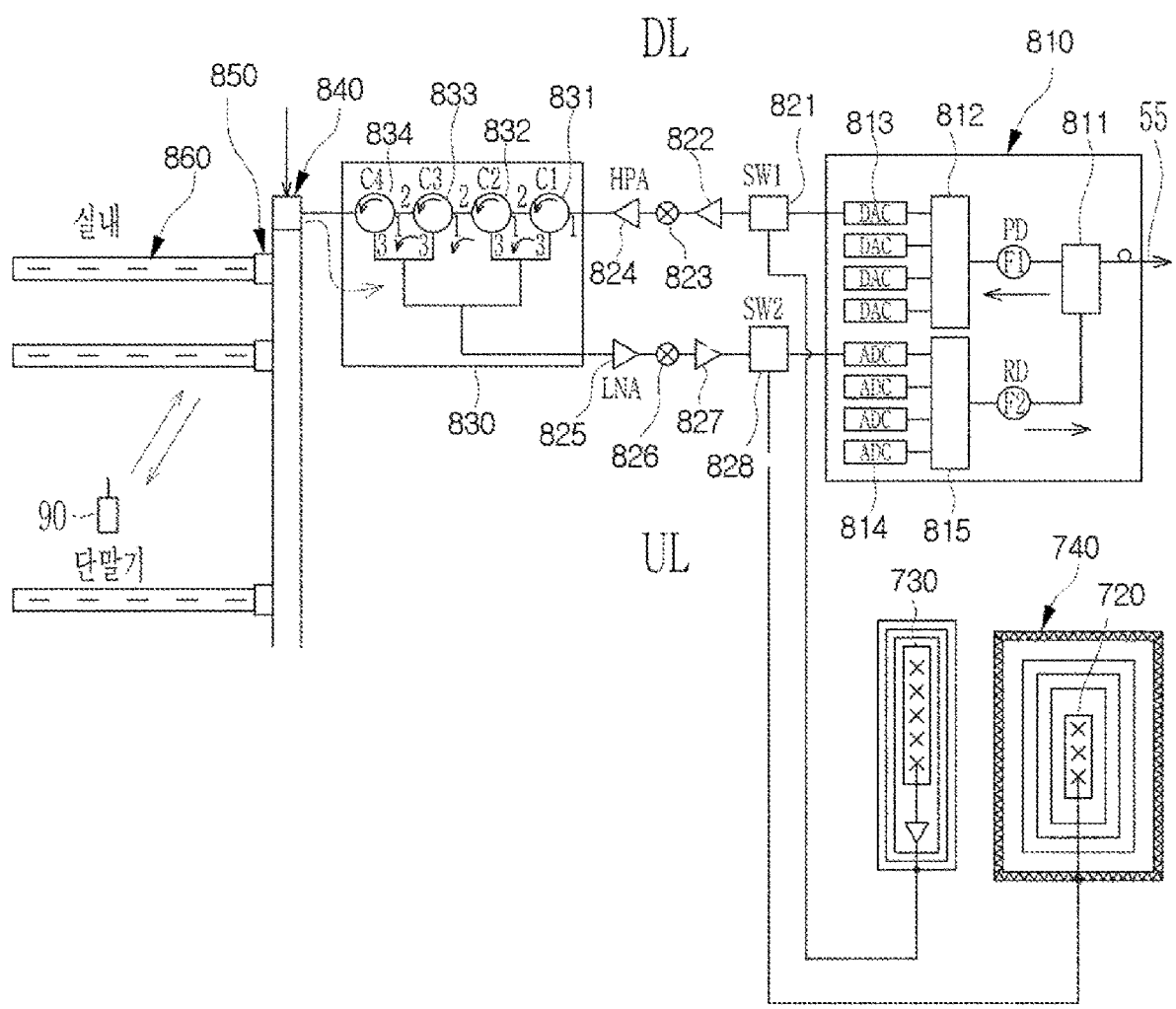
FIG. 12 is an example of a mobile communication antenna system in which an interference canceller is attached to a waveguide type or a coaxial type slot traveling wave antenna of high microwave frequency band C, Ku, Ka band when indoor service is impossible due to shielding and high loss of external service signal in C, Ku, Ka band mobile communication according to another example embodiment of the present disclosure.

FIG. 12 is an example of a mobile communication antenna system according to another example embodiment of the present disclosure, in which an interference canceller is attached to a waveguide type or coaxial slot traveling wave antenna indoors when indoor service is impossible due to high loss and shielding of external service signals in C, Ku, Ka bands.

In the case of 5G mobile communication service with high frequencies such as C, Ku, and Ka in the microwave band, since the directivity of radio waves is strong and thus the service is impossible indoors, it is serviced by installing the multiple formations of the slot antenna 860 in a waveguide slot or coaxial feed line traveling waveform on the ceiling of each floor. In this case, preferably, several antennas are installed in series/parallel at intervals of about 6 m for each floor.

When described in more detail with reference to FIG. 12, a waveguide type or coaxial slot traveling wave antenna 860 is installed on each floor in the building interior, and is connected to the outside of the building by an optical transmission path 50 or a transmitting antenna 720 and a receiving antenna 730.

First, looking at the case of being connected through the optical transmission path 50, the downlink optical signal input to the optical transmission device 810 through the optical transmission path (optical cable) 50 is separated from the optical diplexer 811 to the optical receiving side and converted to digital by the photodiode PD, distributed by the digital divider 812, and then D/AC converted by the digital-to-analog converter 813 for each output and transmitted to the downlink transmission part DL.

The downlink transmission part DL includes a first changer 821, an amplifier 822, an up-converter 823, and a high-power amplifier 824.

The D/AC-converted signal output from the optical transmission device 810 is amplified by the amplifier 822 through the first changer 821 (Sw1) of the downlink transmission part DL, and is converted to an up-frequency by the up-converter 823, and then is amplified by a high-power amplifier (HPA) 824 and is input to a transmission signal interference canceller 830.

When the transmission signal interference canceller 830 is described in detail, the receiving signal downlink transmitted from the optical transmission path 50 is divided by the digital divider 812, converted to each output frequency C, Ku, Ka band, and then is amplified with high output and is input to the terminal 1 of the first circulator 831 (C1) in the transmission signal interference canceller 830. The signal input to the terminal 1 of the first circulator 831 (C1) is output to the terminal 2 with lossless (0.2 dB), and is output to be −25 dB at the terminal 3. The output of terminal 2 of the first circulator 831 (C1) is input to the terminal 1 of the second circulator 832 (C2) and is output to the terminal 2 without loss (0.2 dB), and is output to the terminal 3 with attenuated to be −25 dB or less.

The output of the terminal 2 of the second circulator 832 (C2) is input to the terminal 1 of the third circulator 833 (C3), and then is output without loss from the terminal 2, and is output with attenuated by −25 dB from the terminal 3. The output of the terminal 2 of the third circulator (C3) is input to terminal 1 of the fourth circulator 831 (C4) and then is output to terminal 2 and losslessly transmitted to the waveguide 840 (loss 0.2 dB or less), and is output to the terminal 3 with attenuated to be −25 dB or less.

The output of the terminal 3 of the first circulator 831 (C1) and the output of the terminal 3 of the second circulator 832 (C2), which are respectively −25 dB or less, are add up to be −40 dB or less, and the output of the terminal 3 of the third circulator 833 (C3) and the output of the terminal 3 of the fourth circulator 834 (C4), which are outputted with a loss of −25 dB or less, respectively, is synthesized to be −40 dB or less. When the synthesized signal of the terminal 3 of the first circulator C1 and the second circulator C2 and the synthesized output of the terminal 3 of the third circulator C3 and the fourth circulator C4 are further synthesized, it is adjusted to be −80 dB or less.

The uplink signal input to the terminal 2 of the fourth circulator C4 and output to the terminal 3 is input to the input terminal of the uplink LNA 825 with the waveguide uplink signal almost losslessly. In this way, the high-output signal of the downlink is attenuated to be less than −80 dB at the input terminal of the LNA 825 by the transmission signal interference canceller 830 to remove the interference, and the signal transmitted from the terminal 40 is input from the waveguide type or coaxial slot traveling wave antenna 860, passes through the mode converters TE01 and TE11 and the mode TE10 converters 850 and 840 and is synthesized, and then is input to the terminal 2 of the fourth circulator C4 and is output losslessly (0.2 dB) to terminal 3 and then is input to the LNA 825.

The uplink transmission part (UL) includes an LNA 825, a down converter 826, an amplifier 827, and a second changer 828.

The uplink signal input to the LNA 825 of the uplink transmission part (UL) is converted to a down frequency by the down converter 826, amplified by the amplifier 827, passes through the second changer 828, and is input to the optical transmission device 810.

The optical transmission device 810 converts the uplink signal which is input to digital in the analog-to-digital converter 814, multiplexes it in the digital multiplexer 815, and then converts it into an optical signal in the laser diode RD and transmits it to the optical transmission path 50 through the optical diplexer 811.

In this way, the interference of the transmitting and receiving signals passing through the traveling waveguide slot antenna 860 are removed by attaching a transmission signal interference canceller 830, and the uplink signal input to the LNA 825 is low-noise amplified (LNA) and then frequency converted, and the signal passing through A/DC is digitally synthesized, converted into an optical signal in the laser diode RD, and optically transmitted through the optical diplexer 811 to the optical transmission path 50.

On the other hand, in an area where optical transmission is not possible in some cases, an antenna system (the same as the antenna system of FIG. 10 described above) composed of a separate receiving antenna 730 and a transmitting antenna 720 is attached, and then it is possible to communicate with the outside through an antenna system instead of an optical transmission path by changing in the changers SW1 and SW2. At this time, an antenna interference canceller 740 is attached between the transmitting antenna 720 and the receiving antenna 730 to remove the interference of the transmitting signal affecting the receiving antenna 730.

In this way, the receiving antenna 730 greatly increases the overall gain (60 dB or more) to receive and amplify the transmitting signal of the base station for the link so that the remote terminal 90 may receive the transmitting signal, and the transmitting antenna 720 reduces the gain to reduce interference between other service areas and eliminates interference from other existing service areas. If the interference is less than −80 dB, the choke type quarter-wave metal shield 746 for shielding the receiving antenna 730 may be omitted.

What is claimed is:

1. An antenna device for 5G mobile communication base station and repeater, the antenna device comprising:
a receiving antenna part 210;
a transmitting antenna part 220 separated from the receiving antenna part 210;
a first low-noise amplifier 217-1 connected to an output terminal of the receiving antenna part 210;
a phase shifter 221, 222 connected to the input terminal of the transmitting antenna part 220;
a transmission signal canceller 231, 232 which is an interference canceling synthesizer connected to the first low-noise amplifier 217-1 and the phase shifters 221, 222, respectively; and
a band-pass filter 233, 234 of usable frequency bands connected to each of the transmission signal canceller 231, 232,
wherein the receiving antenna part 210 comprises a plurality of receiving radiation element Rm,
the transmitting antenna part 220 comprises a plurality of transmitting radiation elements Tn,
the antenna device further includes
a second low-noise amplifier 217-2, a switch part 217-3 and a power control panel 240,
wherein when the first low-noise amplifier 217-1 is damaged, the first low-noise amplifier 217-1 is switched to the second low-noise amplifier 217-2 by the switch part 217-3, and the power control panel 240 notifies the operating room of whether the first low-noise amplifier 217-1 is damaged.

2. The antenna device according to claim 1,
wherein the number of receiving radiation element Rm of the receiving antenna part 210 is two to three times more than the number of transmitting radiation element Tn of the transmitting antenna part 220.

3. The antenna device according to claim 1,
wherein a metal shielding film 223 is installed around the transmitting antenna part or the receiving antenna part in order to reduce an interference between the receiving antenna part 210 and the transmitting antenna part 220.

4. The antenna device according to claim 3,
wherein the metal shielding film 223 is a multilayer having a height of ¼ of a wavelength of the transmitting signal band.

5. The antenna device according to claim 1,
wherein a horizontal beam width of the receiving antenna part 210 has the same beam width as a horizontal beam width of the transmitting antenna part 220.

6. The antenna device according to claim 1,
wherein the receiving radiation element Rm is powered by a stripline or microstripline PCB board.

7. The antenna device according to claim 1,
wherein the antenna device further comprises an antenna 300, 400 for 4G, 3G, and 2G communication.

8. The antenna device according to claim 7,
wherein the transmitting antenna part 220 for the 5G, and antennas 300 and 400 of the 2G, 3G, and 4G communication perform an electric beam tilt, and the receiving antenna part 210 for the 5G performs a mechanical beam tilt.

9. The antenna device according to claim 1, further comprises,
a second low-noise amplifier 217-2, a switch 217-3, and a power control panel 240
wherein when the low-noise amplifier 217 is damaged, the first low-noise amplifier 217-1 is switched to a second low-noise amplifier 217-2 by the switch part 217-3, and the power control panel 240 notifies an operating room of whether the first low-noise amplifier 217-1 is damaged.

10. The antenna device according to claim 1,
wherein an antenna outer cover 130 of the antenna device comprises a low-noise amplifier replacement cover 140 on the rear surface for replacing the first and second low noise amplifiers 217-1 and 217-2 by manually opening and closing it when the first and second low-noise amplifiers 217-1 and 217-2 are damaged.

11. The antenna device according to claim 1,
wherein the transmission signal cancellers 231, 232 of the receiving and transmitting antenna part of the 5G antenna remove the interference between the transmitting and receiving signal by further using a circulator or an isolator.

12. The antenna device according to claim 1,
wherein the power control panel 240 is connected to a control cable terminal 241 to connect to the outside, and the control cable terminal 241 is connected to a remote control box 243 located remotely using a remote control connector 242,
an arrester is further attached to the control cable terminal 241 to prevent lightning from entering along the cable.

13. The antenna device according to claim 1,
wherein the first low-noise amplifier 217-1 includes a circulator therein to adjust the output gain of the first low-noise amplifier 217-1, and a variable attenuator may be further added to the output terminal of the first low-noise amplifier 217-1 to remotely adjust the output value of the first low-noise amplifier 217-1.

14. The antenna device according to claim 1,
wherein the transmitting antenna part 220 is configured in vertical and horizontal multiple columns or one column.

15. The antenna device according to claim 1,
wherein the transmission signal canceller 231, 232 is a diplexer.

* * * * *